(12) United States Patent
Tsirkin

(10) Patent No.: US 10,521,149 B2
(45) Date of Patent: Dec. 31, 2019

(54) MEMORY POISONING SUPPORT FOR FREE PAGE HINTING

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 27 days.

(21) Appl. No.: 15/993,047

(22) Filed: May 30, 2018

(65) Prior Publication Data

US 2019/0369903 A1 Dec. 5, 2019

(51) Int. Cl.
*G06F 3/06* (2006.01)

(52) U.S. Cl.
CPC .......... *G06F 3/0652* (2013.01); *G06F 3/0608* (2013.01); *G06F 3/0619* (2013.01); *G06F 3/0644* (2013.01); *G06F 3/0664* (2013.01); *G06F 3/0673* (2013.01)

(58) Field of Classification Search
CPC .... G06F 3/0652; G06F 3/0608; G06F 3/0619; G06F 3/0644; G06F 3/0664; G06F 3/0673
See application file for complete search history.

(56) References Cited

U.S. PATENT DOCUMENTS

| | | | | |
|---|---|---|---|---|
| 5,263,032 A * | 11/1993 | Porter | ................... | G06F 11/106 714/710 |
| 6,742,148 B1 * | 5/2004 | Korhonen | .............. | G11C 29/56 365/201 |
| 9,280,458 B2 | 3/2016 | Durrant | | |
| 9,552,233 B1 | 1/2017 | Tsirkin et al. | | |
| 2002/0099946 A1 * | 7/2002 | Herbert | ............... | G06F 12/1408 713/193 |
| 2008/0077767 A1 * | 3/2008 | Khosravi | ............ | G06F 12/1408 711/216 |
| 2011/0320682 A1 | 12/2011 | McDougall et al. | | |
| 2014/0006879 A1 * | 1/2014 | Rangarajan | ........... | G06F 11/004 714/48 |

(Continued)

FOREIGN PATENT DOCUMENTS

WO 2017107058 6/2017

OTHER PUBLICATIONS

Agarwal, Neha and Wenisch, Thomas F., "Thermostat: Application-Transparent Page Management for Two-tiered Main Memory", Apr. 8-12, 2017, University of Michigan, https://web.eecs.umich.edu/~twenisch/papers/asplos17.pdf, 14 pages.

(Continued)

*Primary Examiner* — Ryan Bertram
(74) *Attorney, Agent, or Firm* — Lowenstein Sandler LLP

(57) ABSTRACT

Systems and methods for virtualization technology that enhances memory page hinting to better support data integrity verification. An example method may comprise: determining, by a processing device executing a hypervisor, an integrity mark of a guest operating system, the integrity mark being associated with content of one or more memory pages; detecting, by the hypervisor, that a memory page is released by the guest operating system; verifying, by the hypervisor, content of the memory page in view of the integrity mark of the guest operating system; and evicting, by the hypervisor, the content of the memory page in response to the verifying.

20 Claims, 8 Drawing Sheets

(56) References Cited

U.S. PATENT DOCUMENTS

| | | | |
|---|---|---|---|
| 2015/0220455 A1* | 8/2015 | Chen .................. | G06F 12/1408 |
| | | | 711/163 |
| 2017/0004001 A1* | 1/2017 | Bacher ................ | G06F 9/45558 |
| 2017/0344298 A1 | 11/2017 | Shih et al. | |
| 2019/0042466 A1* | 2/2019 | Khosravi ............ | G06F 12/1036 |
| 2019/0065276 A1* | 2/2019 | van Riel ............. | G06F 9/45558 |

OTHER PUBLICATIONS

Lal Narayan, Nitesh, "[Patch v6 7/7] KVM: Disabling Page Poisoning to avoid Memory Corruption Errors", Dec. 1, 2017, https://www.spinics.net/lists/kvm/msg159797.html, 3 pages.

Wang, Wei, "[Qemu-level] [PATCH v14 0/5] Virtio-balloon Enhancement", Aug. 17, 2017, https://lists.gnu.org/archive/html/qemu-devel/2017-08/msg03031.html, 3 pages.

\* cited by examiner

MEMORY POISONING SUPPORT FOR FREE PAGE HINTING

TECHNICAL FIELD

The present disclosure is generally related to virtualized computer systems, and more particularly, to memory allocation in virtualized computer systems.

BACKGROUND

Virtualization allows multiplexing of an underlying host machine between different virtual machines. The host machine allocates a certain amount of its resources to each of the virtual machines. Each virtual machine is then able to use the allocated resources to execute applications, including operating systems (referred to as guest operating systems). An executable layer that provides the virtualization is commonly referred to as a hypervisor (also known as a virtual machine monitor (VMM)). The hypervisor emulates the underlying hardware of the host computer, making the use of the virtual machine transparent to the guest operating system and the user of the computer.

A host machine can accommodate more virtual machines than the size of its physical memory allows. Using virtual memory techniques, the host machine can give each virtual machine the impression that it has a contiguous address space, while in fact the memory used by the virtual machine may be physically fragmented and even overflow to disk storage. When the host machine needs to free up memory, it selects memory pages that have been assigned to virtual machines, and pages out the contents of those memory pages to disk storage. When the virtual machines attempt to access those memory pages, the host machine pages in the content of the memory page by reading the content stored in disk storage and writing the content back to memory. Paging out and paging in memory pages requires input/output (I/O) operations, which can cause significant delay for the virtual machine.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
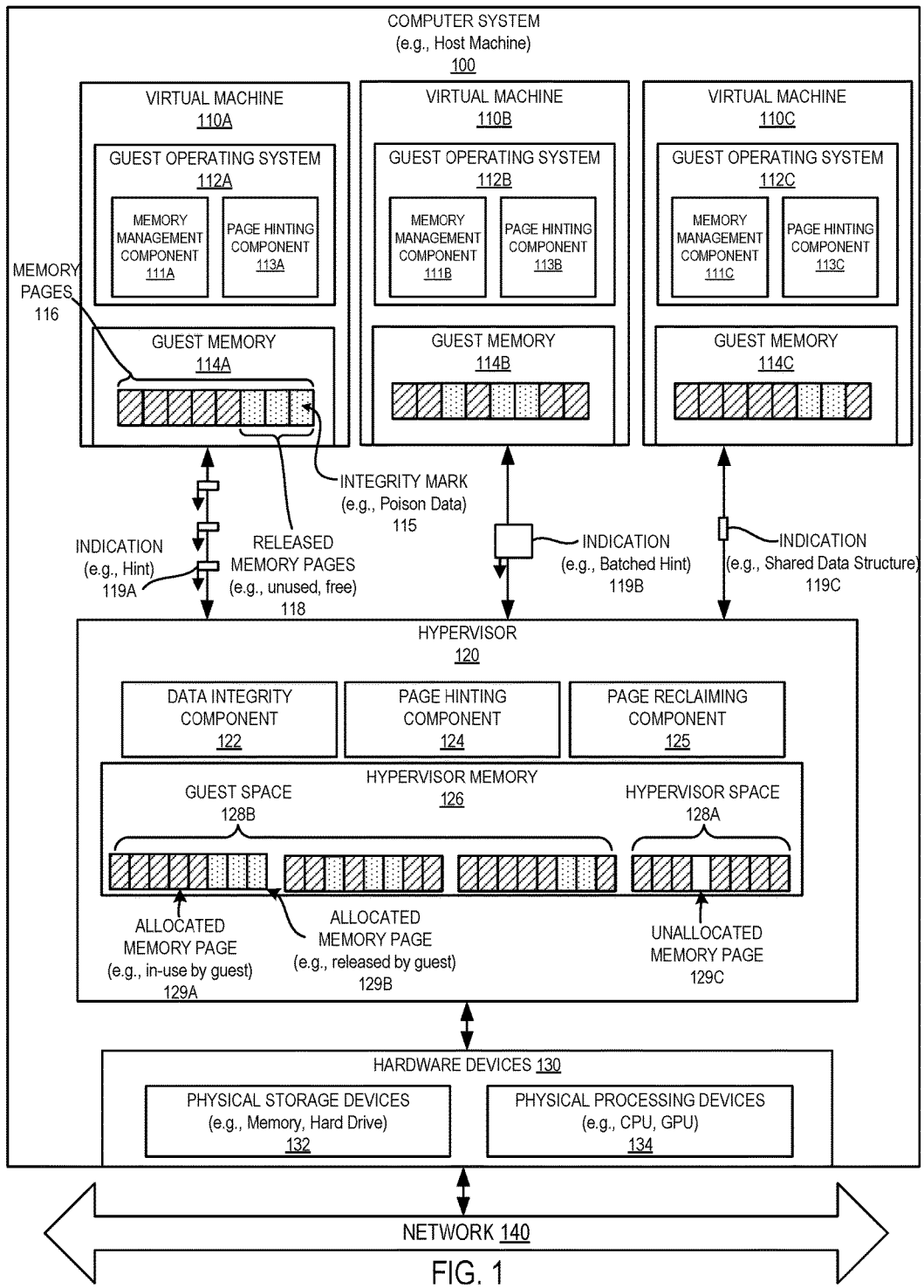
FIG. 1 depicts a high-level block diagram of an example computer system architecture, in accordance with one or more aspects of the present disclosure.

Virtualized computer systems often include overlapping storage management features that manage the same underlying physical storage resources. For example, a hypervisor and a guest operating system may both include storage management features that implement a caching mechanism across different storage devices. The caching mechanism may involve memory pages that are paged to or from a persistent storage. The hypervisor and guest operating systems may function separately and a hypervisor may allocate storage to a virtual machine but may be unaware of which portions of storage are in use by a guest operating system executed by the virtual machine. Knowledge of the guest operating system's use of the storage may be beneficial to a hypervisor managing memory because portions of storage that have been released by the guest operating system may be reused by the hypervisor without the overhead of copying the data to and from persistent storage (e.g., paging). In one example, the guest operating system may interact with the hypervisor and provide free page hints that indicate which of the memory pages allocated to a virtual machine have been freed by the guest operating system.

Some operating systems may include data integrity features that break when the hypervisor reuses a memory page without copying the original content to and from persistent storage. The data integrity features may assign a unique value to data storage and subsequently check the data storage for the unique value to determine whether the data storage was improperly modified. The improper modification may be caused by multiple different sources, such as malicious code, a programming defect, a hardware error, other source, or a combination thereof. In one example, the operating system may include data integrity features that are referred to as page poisoning. Page poisoning may involve an operating system assigning a poison value (e.g., poison pattern) to a memory page when the memory page is freed. The operating system may subsequently check the poison pattern when the memory page is subsequently reallocated. If the poison pattern is not present, the operating system may determine the memory page was modified and provide a notification. The notification may enable the operating system, a debugger, other executable code, or a combination thereof to analyze the memory page to assist with identifying the cause of the modification. The data integrity features of a guest operating system may not function when using the free page hinting discussed above because the value assigned to a released memory page may be overwritten when the hypervisor reuses the page without the value (e.g., poison value) being paging to and from persistent storage.

Aspects of the present disclosure address the above and other deficiencies by providing technology that enables data integrity features of a guest operating system (e.g., page poisoning) to be used in combination with hypervisor optimizations that reduce paging (e.g., free page hinting). In one example, a hypervisor may determine an integrity mark (e.g., unique sequence of bits) used by a guest operating system. The guest operating system may provide the integrity mark to the hypervisor before, during, or after the guest operating system is initialized. The guest operating system may subsequently associate the integrity mark with one or more memory pages before, during, or after the memory page is released (e.g., freed) by the guest operating system.

During normal operation, the hypervisor may determine memory resources are running low and may attempt to reclaim memory. The hypervisor may detect that a plurality of memory pages have been released by the guest operating system and may select one of the memory pages to be evicted. Prior to evicting the memory page, the hypervisor may verify the content of the memory page in view of the integrity mark provided by the guest operating system. When the memory page content does not correspond to the integrity mark (e.g., not match) the hypervisor may notify the guest operating system. When the content of the memory page corresponds to the integrity mark the hypervisor may proceed with evicting the memory page and may avoid copying the content of the memory page to persistent storage because the memory page was already released by the guest operating system.

After the memory page is evicted by the hypervisor, the guest operating system may attempt to reuse the memory page. The hypervisor may detect the attempt and may generate a new memory page and avoid any attempt to page in content from persistent storage. The hypervisor may update the new memory page with the integrity mark previously provided by the guest operating and provide the guest operating system with access to the updated memory page. The guest operating system may check the memory page to verify that it includes the integrity mark prior to reallocating the memory page. The content of the memory page will include the integrity mark so the guest operating system will not falsely determine that the memory page was improperly modified (e.g., corrupted).

The systems and methods described herein include technology that enhances virtualization technology for a computer system. In particular, aspects of the present disclosure provide technology that enhances the security, reliability, efficiency, and/or performance of memory management in a virtualized computer system. The technology may enable both the guest operating system and the hypervisor to detect when content of a memory page is improperly modified and avoid false positives that may occur when page hinting is in use. This may enhance the ability to determine a cause of an improper modification and may enhance the security of the computer system when the cause of the modification is due to malicious code and may enhance the reliability of the computer system when the cause of the modification is due to flaws in the executable code or underlying hardware. In addition, the technology may also enhance the efficiency and performance of the computer system by enabling the hypervisor to reduce the amount of memory pages that are paged into and out of persistent storage (e.g., hard disk drive, solid state drive). This may decrease both the processor cycles and input/output (I/O) overhead required to manage memory of the computer system. The performance enhancements may enable a computing system to reduce the amount of computing resources consumed by a set of virtual machines and enable the computing system to support more virtual machines.

Various aspects of the above referenced methods and systems are described in details herein below by way of examples, rather than by way of limitation. The examples provided below discuss a virtualized computer system that has a hypervisor without an underlying host operating system (e.g., bare metal hypervisor), but other examples may include a hypervisor and host operating system (not shown).

FIG. 1 depicts an illustrative architecture of computer system 100, in accordance with an example of the present disclosure. It should be noted that other architectures for computer system 100 are possible, and that the implementation of a computer system utilizing embodiments of the disclosure are not necessarily limited to the specific architecture depicted. Computer system 100 may be a single host machine or multiple host machines arranged in a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. In one example, computer system 100 may be a computing device implemented with x86 hardware (e.g., Intel®, AMD®). In another example, computer system 100 may be a computing device implemented with PowerPC®, SPARC®, ARM®, or other hardware. In the example shown in FIG. 1, computer system 100 may include one or more virtual machines 110A-C, a hypervisor 120, hardware devices 130, and a network 140.

Virtual machines 110A-C may execute guest executable code that uses an underlying emulation of physical resources. The guest executable code may include one or more guest operating systems 112A-C, guest applications, guest device drivers, other executable code, or a combination thereof. Each of the virtual machines 110A-C may support hardware emulation, full virtualization, para-virtualization, operating system-level virtualization, or a combination thereof. Virtual machines 110A-C may have the same or different types of guest operating systems, such as Microsoft® Windows®, Linux®, Solaris®, etc. The virtual machines 110A-C may execute guest operating systems 112A-C that manage guest memory 114A-C respectively.

Guest operating systems 112A-C may include memory management components 111A-C and page hinting components 113A-C respectively. Components 111A-C and 113A-C may be separate components as shown or may be included into the same component. For example, the features provided by page hinting component 113A may be integrated into the operations performed by memory management component 111A of guest operating system 112A. Memory management component 111A-C may manage aspects of guest memory, such as the allocation and the release of portions of guest memory 114A-C. Memory management component 111A-C may also include features that update a released memory page with an integrity mark 115 and may subsequently verify that the memory page includes the integrity mark 115 when the guest operating system reuses (e.g., reallocates) the memory page. Page hinting components 113A-C may enable guest operating systems 112A-C to indicate to hypervisor 120 the memory pages that are released, allocated, or a combination thereof. In one example, page hinting components 113A-C may record the status of memory pages by updating a set of guest memory pages that have been released. Page hinting components 113A-C may provide the set to the hypervisor using one or more indications 119A-C.

Integrity mark 115 may be any data that can be associated with a memory page and subsequently verified. Integrity mark 115 may be stored as content of a memory page and may include one or more predetermined values that are intended to remain constant over time. The values may include individual numeric or non-numeric values or may include a sequence of values (e.g., consecutive or non-consecutive values). The values may include one or more bits, bytes, words, integers, characters, other values, or a combination thereof and may be represented as one or more binary values (e.g., "0" or "1"), hexadecimal values (e.g., 0xF, 0xOA), other values, or a combination thereof. Integrity mark 115 may occupy an entire memory page, spread across multiple memory pages, or occupy a portion of a memory page and leave the remaining portion with padding data, left over data, other data, or a combination thereof.

The values of integrity mark 115 may be repeated within the content of the memory page based on a pattern. The pattern may be represented by pattern data that indicates one or more values and a predetermined pattern that may or may not repeat the values. In one example, integrity mark 115 may include an individual value (e.g., 1, 0x0A) that is repeated multiple times throughout the storage space of the memory page (e.g., "1"×4 KB). In another example, integrity mark 115 may include an individual value and one or more subsequent values that are based on the individual value. The subsequent values may be incremented, decremented, or other modification of the individual value. For example, the integrity mark may include the value 0 followed by incremented values that occupy the content of the memory page (e.g., memory content includes o, 1, 2, 3, 4, 5, etc.). Any other value or pattern may be used and is within the scope of this disclosure.

Integrity mark 115 may be written or verified by guest executable code (e.g., operating system, application, driver), hypervisor code, a host operating system code, firmware code, a hardware device, other device or executable code, or a combination thereof. Each guest operating system may be associated with one or more unique integrity marks and a hypervisor managing multiple virtual machines may store data capable of indicating the one or more unique integrity marks for the one or more virtual machines that the hypervisor manages. Likewise, the memory managed by the hypervisor may include multiple pages and the multiple pages may correspond to different virtual machines that use different integrity marks.

Guest memory 114A-C may be any virtual memory, logical memory, physical memory, other portion of memory, or a combination thereof for storing, organizing, or accessing data. Guest memory 114A-C may represent a portion of memory that is designated by hypervisor 120 for use by one or more respective virtual machines 110A-C. Guest memory 114A-C may be managed by guest operating system 112A-C and may be segmented into memory pages 116. Memory pages 116 may each include a contiguous or non-contiguous sequence of bytes or bits and may have a page size that is the same or different from a memory page size used by hypervisor 120. In one example, memory pages 116 may correspond to memory blocks of a volatile or non-volatile memory device and may each correspond to an individual memory block, multiple memory blocks, or a portion of a memory block. Memory pages 116 may have a standard size (e.g., page size of 4 KB) or an enlarged size (e.g., page size of 2 MB), which may be referred to as "huge pages."

Hypervisor 120 may also be known as a virtual machine monitor (VMM) and may manage system resources and may provide virtual machines 110A-C with access to one or more features of hardware devices 130. In the example shown, hypervisor 120 may run directly on the hardware of computer system 100 (e.g., bare metal hypervisor). In another example, hypervisor 120 may run on or within a host operating system (not shown). Hypervisor 120 may include hypervisor memory 126, which may include multiple storage blocks that are separated into a hypervisor space 128A and a guest space 128B. Hypervisor space 128A may be allocated for use by hypervisor 120 and guest space 128B may be allocated to virtual machines 110A-C and may correspond to guest memories 114A-C. Each of the storage blocks within hypervisor memory 126 may be either allocated (e.g., 129A and 129B) or unallocated (e.g., 129C). An allocated storage block may be allocated by hypervisor 120 for use by one of the virtual machines 110A-C. The allocated storage block may be in-use by the respective guest operating systems as illustrated by 129A or may not be in use by the respective guest operating system as illustrated by 129B. As shown in FIG. 1, hypervisor 120 may include a data integrity component 122, a page hinting component 124, and a page reclaiming component 125.

Data integrity component 122 may enable hypervisor 120 to verify and retain the integrity of the memory pages released by guest operating systems 112A-C. Data integrity component 122 may be aware of the integrity marks of the respective guest operating systems and may verify memory pages in view of the integrity marks prior to evicting memory pages. Data integrity component 122 may also or alternatively enable the hypervisor to restore an integrity mark to the memory pages when the underlying memory resources are reclaimed by the hypervisor and overwritten.

Page hinting component 124 may enable hypervisor 120 to process memory page hints received from virtual machines in the form of indications 119A-C. The memory page hints may indicate which of the memory pages associated with a virtual machine are in use or not in use by the respective virtual machines 110A-C. For example, a hypervisor may allocate a portion of hypervisor memory 126 for use by virtual machine 110A and the guest operating system 112A may manage the allocated portion as shown by guest memory pages 116. Guest operating system 112A may optimize the use of guest memory 114A by allocating a portion of memory pages 116 to processes (e.g., guest executable code) managed by guest operating system 112 and may use the remaining portions as file system cache. As guest operating system 112A executes, it may release one or more guest memory pages (e.g., released memory pages 118) and may transmit indication 119A to hypervisor 120 to indicate the one or more storage blocks were released.

Page hinting component 124 may identify portions of hypervisor memory 126 that can be reclaimed and used to fulfill requests for additional memory. Page hinting component 124 may analyze indication data (e.g., hint data) to identify portions of memory that have been allocated to a guest virtual machine but are not in use by the guest virtual machine. This may enable the hypervisor to distinguish between a memory page that is in use by guest operating system 112A from a memory page that is allocated to virtual machine 110A but is not in use by guest operating system 112A. Hypervisor 120 may use this analysis to determine whether the memory pages are released memory pages 118 and may be reused without copying the content of the memory page to and from a backing store (e.g., paging in/out).

Released memory pages 118 may be any portion of guest memory 114A that has been released by the guest operating system. Releasing a memory page may involve a guest operating system instructing a virtual machine to execute a release operation that is the same or similar to freeing, deallocating, dereferencing, deleting, removing, moving, other operation, or a combination thereof. In one example, a release operation may be initiated by the guest operating system in response to being notified that a memory page is no longer in use. This may occur when a process managed by the guest operating system makes a system call to the guest operating system to free the memory page. In another example, a release operation may be initiated by the guest operating system in response to determining the memory page is no longer in use by a process or thread managed by the guest operating system (e.g., garbage collection). In either example, releasing a memory page may result in the memory page being available for reuse by the guest operating system while remaining allocated to the virtual machine executing the guest operating system. Guest operating systems 112A-C may use indications 119A-C to indicate to hypervisor 120 that particular memory pages are no longer in use (e.g., released memory pages 118).

Indications 119A-C may include one or more signals for indicating to hypervisor 120 that one or more memory pages assigned to a virtual machine have been released by the guest operating system of the virtual machine. The signal may be a message, interrupt, notification, exception, trap, other signal, or a combination thereof. Indications 119A-C may be transmitted from a virtual machine to the hypervisor, from the hypervisor to the virtual machine, or a combination thereof. Indications 119A-C may occur before, during, or after a guest memory page is released by the guest operating system. The technology disclosed herein may implement one or more of indication 119A, indication 119B, indication 119C, other indication mechanism, or a combination thereof.

Indication 119A may be a message transmitted from virtual machine 110A to hypervisor 120 that includes identification data (e.g., identifier) of a released memory pages 118 or a range of released storage blocks. Indication 119A may be one of a series of indications and each indication in the series may identify an individual memory page or an individual range of memory pages. Indication 119A may be transmitted in response to a particular memory page being released by the guest operating system and may indicate to the hypervisor that the particular memory page has been released. In one example, each indication 119A may correspond to a system call, hypercall, other function call, or a combination thereof that is initiated by guest operating system 112A.

Indication 119B may a batched message that is similar to indication 119A and may include multiple memory pages, memory page ranges, or a combination thereof. Batching the memory pages into indication 119B (e.g., batched message) may be advantageous because it may reduce the communications overhead (e.g., I/O) that occurs between virtual machine 110B and hypervisor 120. Indication 119B may be transmitted from virtual machine 110B to hypervisor 120 in response to a quantity of released memory pages satisfying (e.g., at, above, or below) one or more threshold quantities. The threshold quantities may be based on a particular quantity of memory pages (e.g., page count) or a quantity of space occupied by the memory pages (e.g., buffer space limit). The threshold quantities may include one or more values that may include integers, percentages, ratios, other values, or a combination thereof. The values may be relative to the size or limit of the guest memory, hypervisor memory, physical storage devices, heap, page, buffer, other data structure, or a combination thereof.

Indication 119C may include one or more signals that identify a shared data structure that represents the status of hypervisor memory pages. The shared data structure may indicate to hypervisor 120 which hypervisor memory pages include guest pages that are released, un-released, or a combination thereof. Indication 119C may include a first signal that may be sent prior to a guest memory page being released and one or more second signals may be sent after one or more memory pages are released. The first signal may be in the form of a message that is transmitted during an initialization of guest operating system 112C or initialization of a particular memory page management module of guest operating system 112C. The first signal may include information (e.g., reference, pointer) identifying the shared data structure that represents guest memory 114C. When the one or more memory pages are released, the respective virtual machine 110C may update the shared data structure to indicate to hypervisor 120 that one of the hypervisor memory pages is unused by the guest operating system 112C. Hypervisor 120 may subsequently access the shared data structure after the memory pages are released. In one example, hypervisor 120 may listen for second signals (e.g., modification events) that indicate the shared data structure was updated. In another example, hypervisor 120 may not listen for second signals and may access the shared data structure when hypervisor 120 determines memory pages should be reallocated (e.g., memory page faults exceed a threshold or available memory pages fall below a threshold).

The shared data structure may be modified by one or more of the virtual machines and may be accessible to the hypervisor. The shared data structure may be an array (e.g., bitmap), a linked list, other data structure, or a combination thereof. The shared data structure may include an element (e.g., bit, node) for each of the memory pages and the element may indicate whether the memory page is released, un-released, or other state. In one example, the shared data structure may be stored in the guest memory of the virtual machine. For example, each virtual machine may include a shared data structure in its respective guest memory 114A-C, which may be accessible to hypervisor 120. In another example, the shared data structure may be stored in hypervisor memory 126 and be accessible to one or more of the virtual machines. In the latter example, there may be a separate shared data structure within hypervisor memory 126 that corresponds to each of the virtual machine 110A-C or there may be a single shared data structure accessible to the group of virtual machines 110A-C.

Hardware devices 130 may provide hardware functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks discussed above in regards to components 122, 124, and 125. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit (CPU).

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
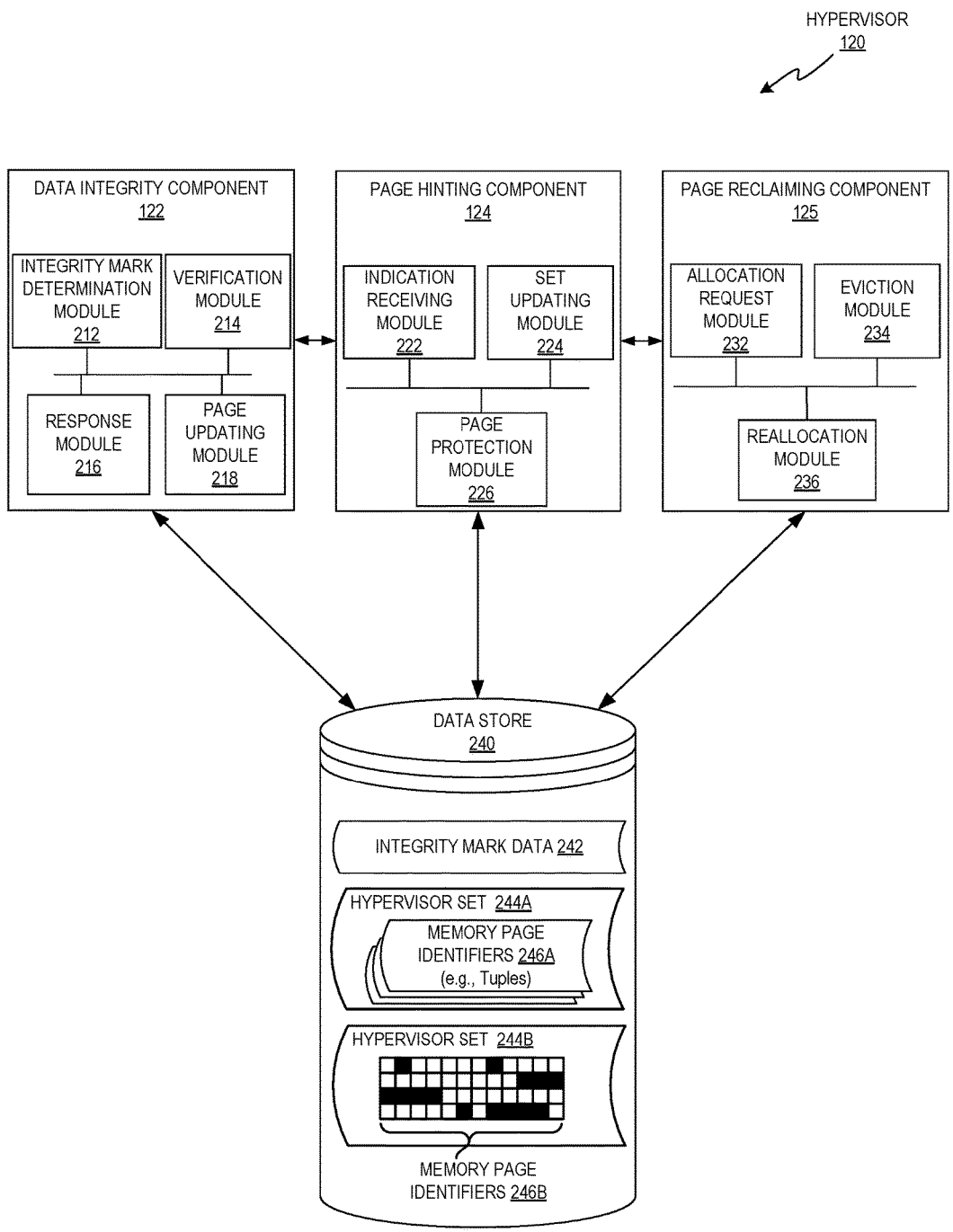
FIG. 2 depicts a block diagram of an example hypervisor that enhances an implementation of memory page hinting to enhance data integrity verification, in accordance with one or more aspects of the present disclosure.

FIG. 2 is a block diagram illustrating example components and modules of hypervisor 120, in accordance with one or more aspects of the present disclosure. Hypervisor 120 may include a data integrity component 122, a page hinting component 124, a page reclaiming component, and access to a data store 240. More or less components may be included without loss of generality. For example, two or more of the components or portions of the components may be combined into a single component, or one of the components may be divided into two or more modules. In one implementation, one or more of the modules may be executed by different processing devices on different computing devices (e.g., different server computers).

Data integrity component 122 may enable hypervisor 120 to verify and restore the integrity of memory pages released by the guest operating system. As discussed above, the integrity mark may be applied to a memory page before, during, or after the memory page is released by the guest operating system. The integrity mark may function as a unique mark that can be subsequently checked to determine if the memory page has been improperly modified. Data integrity component 122 may be aware of the integrity mark of the guest operating system and may verify the content of memory pages prior to evicting the memory pages. Data integrity component 122 may also or alternatively enable the hypervisor to restore an integrity mark to a memory page after its underlying physical memory resources have been reused and the content overwritten. In the example shown in FIG. 2, data integrity component 122 may include an integrity mark determination module 212, a verification module 214, a response module 216, and a page updating module 218.

Integrity mark determination module 212 may enable hypervisor 120 to determine the integrity mark of a guest operating system and to store the integrity mark or data indicative of the integrity mark within data store 240. The integrity mark may be selected by guest executable code (e.g., guest operating system, driver, or application), hypervisor, host operating system, hardware device, other executable code or device, or a combination thereof. Selecting the integrity mark may involve selecting an integrity mark from a plurality of available integrity marks or dynamically defining (e.g., creating) an integrity mark based on one or more factors. The factors may be based on data of the guest executable code, virtual machine, hypervisor, host, processing device, memory controller, memory device, other data, or a combination thereof.

Once the integrity mark is selected, it may be shared with the hypervisor, guest operating system, or a combination thereof. Determining the integrity mark may involve the guest operating system providing the integrity mark to the hypervisor over a communication channel. The communication channel may be the same or similar to the communication channel in which the indications (e.g., page hints) are provided and may involve one or more hypercalls, memory pages, shared memory data structures, other data transfer, or a combination thereof. In one example, the hypervisor may determine the integrity mark via one or more hypercalls initiated by the guest operating system. In another example, the hypervisor may determine the integrity mark by inspecting one of the released memory pages that already includes the integrity mark. For example, the first released memory page indicated by the guest operating system may include the integrity mark selected by the guest operating system and may be used to indicate the content of the integrity mark to the hypervisor. The hypervisor may then store this integrity mark and use it to verify subsequent memory pages (e.g., a second and third memory page) with or without using it to verify the first memory page. In a further example, determining the integrity mark may involve the hypervisor selecting an integrity mark and providing the integrity mark to the guest operating system over a communication channel. In any of these examples, hypervisor 120 may store data indicative of the integrity mark as integrity mark data 242 in data store 240.

Hypervisor 120 may subsequently access integrity mark data 242 to verify that content of a memory page includes the integrity mark or to update content of a memory page to include the integrity mark. Integrity mark data 242 may include any data that may enable the hypervisor to detect, compare, or generate the integrity mark and may include value data, instruction data, pattern data, other data, or a combination thereof. In one example, the integrity mark data may include a data value assigned to a memory page by the guest operating system. The data value may include page poisoning data comprising a predetermined sequence of bits (e.g., all "1"s or alternating "0s" and "1s").

Verification module 214 may enable hypervisor 120 to verify a memory page in view of the integrity mark of the guest operating system. The verification may determine that the memory page corresponds to (e.g., includes) the integrity mark or that the memory page does not correspond to (e.g., not include) the integrity mark. Verifying the memory page may include one or more verification operations that access content of a memory page and integrity mark data 242. The verification operations may involve analyzing the content of the memory page and comparing the content with the integrity mark data 242 to determine if there is or is not a match. As discussed above, the integrity mark may occupy a portion of the content of the memory page, all of the content of the memory page, span across multiple memory pages, or a combination thereof. Therefore, the verification operation may compare some content or all content of one or more pages to verify memory pages.

Hypervisor 120 may verify the memory page at any point before, during, or after the memory page is reused (e.g., evicted and reassigned) by the hypervisor. The timing of the verification may be advantageous because it may enable the hypervisor to detect the memory page was affected by an improper modification prior to the memory page being reused. This may enable the hypervisor to avoid overwriting the improper modification and enable the improper modification to be analyzed to determine the cause of the improper modification. Hypervisor 120 may verify the memory page in view of the integrity mark data after receiving an indication that the memory page has been released but before, after, or during an eviction of the memory page. The integrity mark may be verified multiple times and may be verified by the hypervisor, guest operating system, other executable code or device, or a combination thereof. For example, the hypervisor may verify the integrity mark prior to an eviction of the memory page and the guest operating system may verify the integrity mark after the eviction of the memory page. In one example, the hypervisor may analyze an indication that a particular memory page was released by the guest operating system and may invalidate a guest page table entry corresponding to the memory page. After invalidating the guest page table entry, the hypervisor may verify the memory page in view of the integrity mark data 242.

Response module 216 may enable the hypervisor to respond when verification module 214 indicates the integrity mark is absent from the memory page. An advantage to having the hypervisor verify the integrity of memory pages is that it enables the hypervisor to detect and improper modification and avoid reusing the memory page, which would hide evidence of the improper modification. Response module 216 may enable the hypervisor to respond to detecting an improper modification by generating an event record of the failed verification, canceling the eviction, providing a notification to guest executable code, other response, or a combination thereof. Generating an event record may involve storing an indication that a verification operation detected the memory page does not include the integrity mark and that the memory page may have been improperly modified. The event record may be stored in a log data structure (e.g., log file, log database), transferred over a communication channel, or a combination thereof. The event record may be accessible to the hypervisor, guest executable code, host operating system, other executable code or device, or a combination thereof.

Cancelling the eviction of the memory page may be the same or similar to terminating, aborting, stopping, withdrawing, or halting the reuse of the memory page by the hypervisor. This may cause the memory page to remain assigned to the virtual machine and available to the guest operating system for inspection or re-allocation when appropriate. Cancelling the eviction may involve avoiding the completion of the eviction and may skip a particular memory page from being reclaimed by the hypervisor. Cancelling the eviction may also involve retracting (e.g., undoing, backing out) one or more modifications performed by the computing system, such as the invalidation of the guest page table entry (PTE), memory page access restriction (e.g., write protecting, unmapping from guest), other action, or a combination thereof. The cancellation of the eviction may occur at any point after the verification and prior to the content of the memory page being reused, overwritten, discarded, altered, or other action.

Response module 216 may also or alternatively notify the guest executable code that the memory page was improperly modified or that the hypervisor was unable to verify that the memory page included the integrity mark. The notification may be a signal transmitted using any communication channel between the hypervisor and the guest operating system. The signal may be initiated by the hypervisor and interpretable by guest executable code and may include a message, interrupt, notification, exception, trap, other signal, or a combination thereof. The notification may enable the guest executable code to detect the improper modification, which may enable the guest executable code to avoid the improperly modified content from being hidden (e.g., overwritten, discarded).

Page updating module 218 may enable the hypervisor to restore an integrity mark to a memory page of the guest operating system after the underlying physical memory was reused. The memory page of the guest operating system may be associated with a particular portion of virtual machine memory that is backed by a hypervisor memory page. Page updating module 218 may enable hypervisor 120 to update the hypervisor memory page to include the integrity mark of the guest operating system. Page updating module 218 may write the mark to the memory page in view of integrity mark data 242. As discussed above, the integrity mark data 242 may include value data, instruction data, pattern data, other data, or a combination thereof. Integrity mark data 242 may enable the hypervisor 120 to generate an integrity mark and the page updating module 218 may copy, write, or update the memory page to include the generated integrity mark.

The integrity mark generated by the hypervisor may be the same or similar to the original integrity mark written to the memory page by the guest operating system. In one example, the integrity mark generated by the hypervisor may be identical to the integrity mark previously generated by the guest operating system and neither the hypervisor, guest operating system, applications, drivers, other guest executable code, or a combination thereof can distinguish between the integrity mark generated by the guest operating system and the integrity mark generated by the hypervisor. In another example, the integrity mark generated by the hypervisor may be similar but not identical to the integrity mark previously generated by the guest operating system. For example, the integrity mark may include less data, more data, different data, or a combination thereof and may include one or more modified values (e.g., incremented values, decremented values, hash values, other values). The guest executable code may detect that the hypervisor generated integrity mark is a variation of the original integrity mark (non-identical) generated by the guest operating system and written to the memory page. In either example, the guest executable code may verify that the hypervisor generated mark (e.g., identical or non-identical) is a match for verification purposes.

Page updating module 218 may update the memory page at any point prior to the guest operating system reusing (e.g., reallocating) the memory page. In one example, page updating module 218 may update the memory page in response to the hypervisor receiving an indication that the guest operating system is attempting to access the memory page that was previously released by the guest operating system. The memory page of the guest operating system may no longer be present in an underlying physical storage device (e.g., main memory device) because the underlying memory may have been reclaimed by the hypervisor and assigned to another virtual machine, to the hypervisor, device, other executable code or device, or a combination thereof. After updating the memory page with the integrity mark, the hypervisor may assign the memory page to the virtual machine so that it can be verified and reallocated by the guest operating system. The features of page updating module 218 may be integrated with or accessed by page hinting component 124 or page reclaiming component 125.

Page hinting component 124 may enable the hypervisor to detect that memory pages that were previously in use by the guest virtual machine have been released (e.g., freed) by the guest operating system. Page hinting component 124 may receive and process hints in the form of one or more indications from one or more virtual machines managed by hypervisor 120. Page hinting component 124 may process the indications to identify a set of memory pages that have been assigned by the hypervisor to a virtual machine but are not allocated to a process managed by the guest operating system of the virtual machine. In the example shown in FIG. 2, page hinting component 124 may include an indication receiving module 222, a set updating module 224, and a page protection module 226.

Indication receiving module 222 may enable hypervisor 120 to receive and process indications from one or more virtual machines managed by hypervisor 120. The indications may include memory page identification data for identifying one or more hypervisor memory pages or ranges of hypervisor memory pages that contain content released by the guest operating system. Memory page identification data may include an offset value (numeric or non-numeric value), an address (virtual, logical, or physical address), a pointer, a link, other data, or a combination thereof. In one example, the identification data may be a memory page identifier that uniquely identifies a guest memory page, a hypervisor memory page, other portion of memory, or a combination thereof. The identification data may be data (e.g., offset value) that may be used by hypervisor 120 to determine a hypervisor memory page identifier of a memory page that includes content released by a respective guest operating system. In another example, the identification data may include a reference to a data structure that indicates the one or more hypervisor memory pages that are released (e.g., not in use), non-released (e.g., in use), or a combination thereof. The data structure may be an array (e.g., bitmap), a linked list, other data structure, or a combination thereof.

Set updating module 224 may update a set of memory pages based on data of indication receiving module 222. The set of memory pages may be in any form (e.g., hypervisor set 244A or 244B) and may be updated by the hypervisor to reflect the memory pages that are allocated by a guest operating system and/or memory pages that are unallocated by the guest operating system. The set may be accessed and modified by the hypervisor and may or may not be accessible by a guest operating system. Updating the set may involve adding a memory page to the set or removing a memory page from the set depending on whether the memory page is currently unallocated by the guest operating system of the virtual machine. The memory pages may be guest memory pages, hypervisor memory pages, other portions of memory, or a combination thereof. In one example, set updating module 224 may add a memory page to the set of memory pages in response to receiving an indication that the memory page includes content released by a guest operating system.

The set of memory pages may be represented by a data structure such as hypervisor set 244A or hypervisor set 244B. Hypervisor sets 244A and 244B may include data that enables the hypervisor to track which memory pages or ranges of memory pages have been released by the guest operating system. In one example, hypervisor sets 244A and 244B may identify hypervisor memory pages that include the content of multiple guest memory pages that have been released by the guest operating system.

Hypervisor set 244A may be an example set that includes one or more memory page identifiers 246A. Each of the memory page identifiers 246A may be an element of the set that uniquely identify a memory page or a range of memory pages that is allocated to a virtual machine but may or may not be in use by the virtual machine (e.g., released by guest operating system). In one example, hypervisor set 244A may include the memory pages that have been released by the guest operating system without including memory pages that are in use by the guest operating system. In another example, hypervisor set 244A may include memory pages that are not in use (e.g., released) and memory pages that are in use by the guest operating system. In either example, hypervisor set 244A may include one or more memory page identifiers 246A.

Memory page identifiers 246A may include offset data (numeric or non-numeric values), address data (virtual, logical, or physical addresses), length data, link data (e.g., a pointer or link), other data, or a combination thereof. In one example, each of the memory page identifiers 246A may include a tuple that is stored as a variable and may have a 32 byte size, 64 byte size, or other size. The tuple may represent one or more memory pages or ranges of memory pages (e.g., hypervisor pages or guest pages) using a combination of values. The combination of values may include multiple separate address values, a single address value and a length value, other values, or a combination thereof. The address values may indicate the start, end, middle, other location, or a combination thereof of a particular guest memory page. The length value may indicate a contiguous length of memory space represented by the tuple. The length may be less than, equal to, or greater than a guest memory page size, a hypervisor memory page size, multiple guest or hypervisor memory pages, other size, or a combination thereof.

Hypervisor set 244B is another example set and includes one or more memory page identifiers 246B. Memory page identifiers 246B may represent either hypervisor memory pages or guest memory pages that include content that is not in use by a virtual machine (e.g., released by guest operating system). Each of the memory page identifiers 246B may correspond to an element of a data structure and may represent a state of a particular memory page. The states may include a released state (e.g., not in use), a non-released state (e.g., in use), other state, or a combination thereof. The data structure may be an n-dimensional array, linked list, other data structure, or a combination thereof. In one example, hypervisor set 244B may be an array of binary elements and the array may function as a bitmap. Each memory page identifier 246B may correspond to one of the binary elements (e.g., bit, flag, marker) and may indicate whether the corresponding hypervisor or guest memory page is in a first state (e.g., released) or in a second state (e.g., unreleased). In another example, hypervisor set 244B may be a linked list of elements (e.g., nodes) the nodes representing respective hypervisor or guest memory pages. In either example, the beginning of the array (e.g., first element) may correspond to a first memory page in a continuous or non-contiguous sequence of memory pages and the location (e.g., position) of an element relative to the first element of the data structure may indicate which memory page is represented by the state of the element.

Page protection module 226 may enable hypervisor 120 to restrict access to the memory page before, during, or after it is released by the guest operating system. Page protection module 226 may restrict access from any or all of the guest executable code, hypervisor, host operating system, one or more hardware devices, or a combination thereof. Restricting access may involve locking, write protecting, other access modification (e.g., read or write access), or a combination thereof. In one example, hypervisor 120 may unmap the memory page from the guest virtual machine to restrict the ability of the virtual machine and any guest executable code from modifying the memory page after it was released and updated with the integrity mark.

Page reclaiming component 125 may interact with data integrity component 122 and page hinting component 124 to identify portions of memory that can be assigned by the hypervisor to fulfill requests for memory resources. Page reclaiming component 125 may analyze data of page hinting component 124 to identify hypervisor memory pages that have been allocated to a virtual machine but are not allocated by the guest operating system of the virtual machine. For example, a memory page may be allocated to a virtual machine but may have been released by the guest operating system of the virtual machine and may remain in an allocated but unused state (e.g., released). Traditionally, reclaiming a memory page assigned to a virtual machine may involve paging content of the memory page to a backing store before reallocating the memory page to fulfill a request for memory resources. The technology disclosed herein may enable hypervisor 120 to reclaim memory pages in a more efficient manner because the hypervisor may be configured to detect when a memory page allocated to a virtual machine is not allocated by the guest operating system. As a result, page reclaiming component 125 may reclaim a memory page without copying the content of the memory page to a backing store and conversely avoid retrieving the content from the backing store when the virtual machine attempts to re-access the original guest memory page. In the example shown in FIG. 2, page reclaiming component 125 may include an allocation request module 232, an eviction module 234, and a reallocation module 236.

Allocation request module 232 may enable the hypervisor to detect when memory resources should be reclaimed to satisfy one or more memory allocation requests. The memory allocation requests may originate from a virtual machine, hypervisor, other executable code, or a combination thereof. The allocation requests may be detected by the hypervisor using a variety of different mechanisms. A first mechanism may involve detecting page faults initiated when a virtual machine or hypervisor attempts to access a memory page that no longer resides in the physical memory device. The page fault may be detected and handled by the hypervisor and may function as a memory allocation request. A second mechanism may involve a memory page reclamation technique that is the same or similar to memory page ballooning.

Memory page ballooning may enable a computer system to shift memory between the hypervisor and one or more virtual machines. Memory page ballooning may enable the total amount of memory page resources (e.g., memory pages) occupied by the guest virtual machines to exceed the amount of physical memory page resources (e.g., main memory) available on the computer system. When the computer system is low on physical memory page resources the memory page ballooning may allocate the memory page resources selectively among the virtual machines. The memory page balloon represents the memory page provided to other virtual machines and the process of a virtual machine relinquishing memory page may be referred to as inflating the balloon and the process of acquiring memory page may be referred to as deflating the balloon. Portions of memory page ballooning may be implemented within each of the virtual machines in the form of a driver (e.g., balloon driver) or memory page function (e.g., kernel memory page management module) of the guest operating system. Memory page ballooning may enable multiple virtual machine to share memory page resources amongst one another in a voluntary or involuntary manner. In one example, memory page ballooning may be the same or similar to a computer memory reclamation technique known as virtual memory ballooning. Virtual memory ballooning may be used by hypervisor 120 to enable the computer system (e.g., host machine) to retrieve unused memory from certain guest virtual machines.

The act of relinquishing memory page may be different then the act of releasing memory page that is discussed above. Releasing a memory page may involve a guest operating system freeing the memory page that remains allocated to the virtual memory executing the guest operating system. A guest operating system that releases memory page may not change the amount of memory page allocated to the virtual machine and may just change the use of the memory page allocated to the virtual machine. Therefore, a guest operating system that releases memory pages may enable the total amount of memory page allocated to the virtual machine to remain constant (e.g., approximately the same). In contrast, relinquishing memory page may involve the guest operating system identifying a portion of memory (e.g. multiple memory pages) that can be given back to the hypervisor so that the total amount of memory page allocated to the virtual machine changes (e.g., does not remain constant) and either decreases (e.g., balloon inflates) or increases (balloon deflates).

Eviction module 234 may enable hypervisor 120 to respond to a memory allocation request and to evict one or more memory pages to satisfy the request for additional memory resources. Eviction module 234 may gather data about multiple different aspects of each memory page, such as, data from page hinting component 124, the source of the memory page (e.g., associated virtual machine, original owner), the size of the memory page (e.g., standard page or huge page), the location of the memory page (e.g., proximity to other released memory pages), other information, or a combination thereof. Eviction module 234 may analyze the set of released memory pages (e.g., set 244A or 244B) and the other data and may select one or more candidate memory pages (e.g., eviction candidates) that may be used to fulfill the request. The selection of a memory page may take into account the amount of memory pages that should be reassigned, the locality of the memory pages (e.g., whether they are partially or completely contiguous), the size (e.g., a single huge page better than multiple standard pages), other aspects, or a combination thereof.

After selecting a candidate memory page for eviction, eviction module 234 may verify whether the memory page still includes its corresponding integrity mark. This may involve determining whether the candidate memory page corresponds to a virtual machine that is associated with an integrity mark. Hypervisor 120 may have previously determined the virtual machine is associated with an integrity mark during an initialization of the guest operating system via integrity mark determination module 212. If the corresponding virtual machine is associated with an integrity mark, the hypervisor may initiate verification module 214 to determine whether the candidate memory page still includes the integrity mark. When the integrity mark is absent from the candidate memory page, eviction module 234 may invoke response module 216 and may cancel the eviction of the candidate memory page. When the integrity mark is present in the candidate memory page, eviction module 234 may proceed with evicting the candidate memory page. Being that the candidate memory page corresponds to a memory page that was released by the guest operating system, the eviction module 234 may evict the memory page without copying the content of the candidate memory page to a backing store (e.g., secondary storage).

Reallocation module 236 may enable hypervisor 120 to detect when the guest operating system is attempting to reuse (e.g., reallocate) memory of the virtual machine that is no longer present in a physical memory device (e.g., was previously evicted). Reallocation module 236 may detect that the guest operating system is attempting to access the evicted memory page by listening for page faults, as discussed above. For example, the guest operating system may attempt to access a guest memory page that was released by the guest operating system and subsequently evicted and reused by the hypervisor. Attempts to access the memory page may cause the underlying hardware device (e.g., CPU, memory controller) to generate a page fault that indicates the content of the guest memory page is absent from main memory.

Reallocation module 236 may enable the hypervisor to handle the page fault by invoking features of eviction module 234 and data integrity component 122 to identify a replacement memory page. In one example, reallocation module 236 may respond to the page fault by generating a new memory page as a replacement memory page. The new memory page may be created in available memory or may require existing memory pages to be evicted. In another example, reallocation module 236 may reassign an existing memory page as a replacement memory page. In either example, reallocation module 236 may initiate page updating module 218 to update the replacement memory page to include the integrity mark of the guest operating system. Reallocation module 236 may then assign the replacement memory page to the virtual machine executing the guest operating system.

Figure 3:
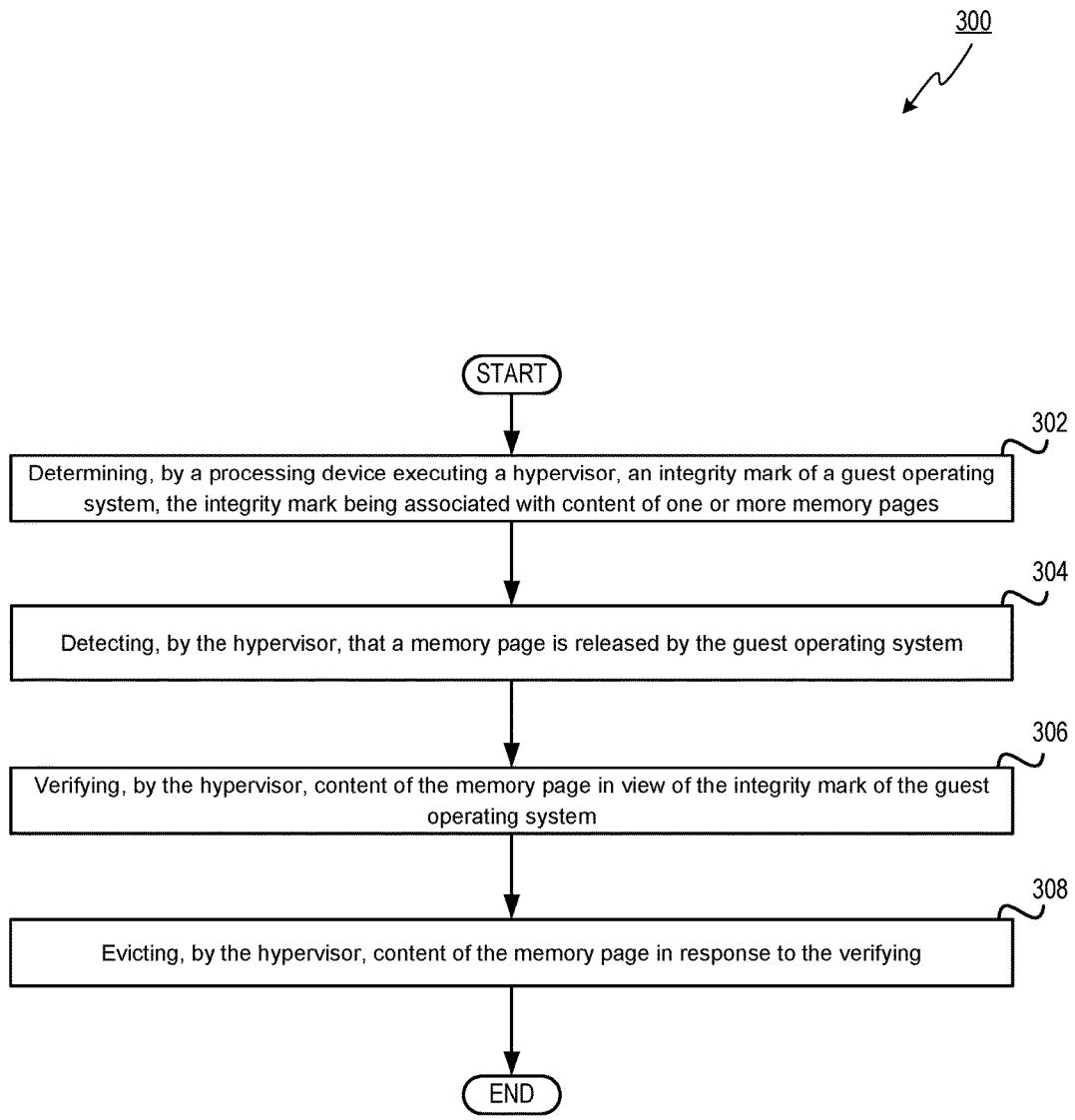
FIG. 3 depicts a flow diagram of an example method executed by a hypervisor to implement memory page hinting that supports data integrity verification by the hypervisor, in accordance with one or more aspects of the present disclosure.
Figure 4:
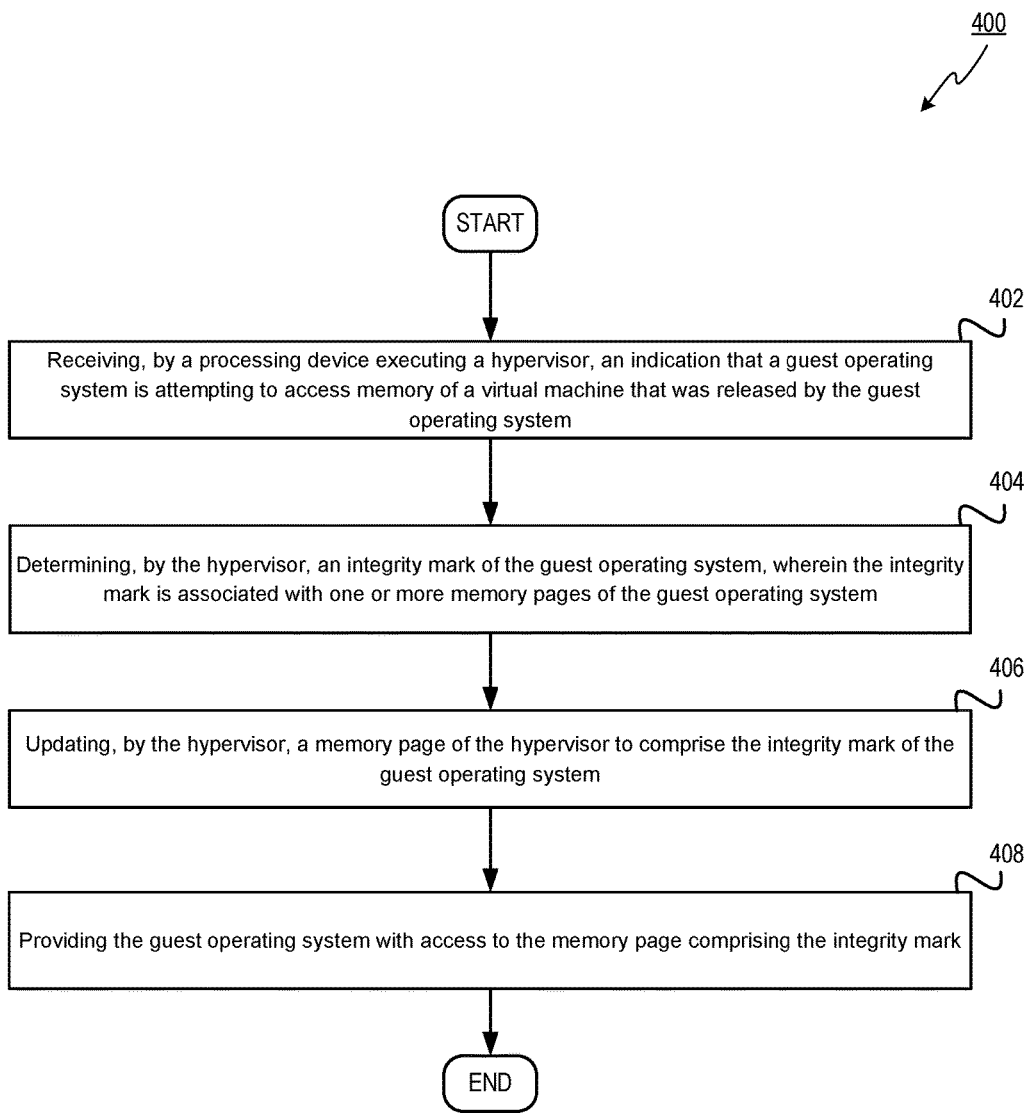
FIG. 4 depicts a flow diagram of an example method executed by a hypervisor to implement memory page hinting that supports data integrity verification by the guest operating system, in accordance with one or more aspects of the present disclosure.

FIGS. 3 and 4 depict flow diagrams for illustrative examples of methods 300 and 400 for virtualization technology that enhances an implementation of memory free page hinting to support data integrity verification, in accordance with one or more aspects of the present disclosure. Method 300 illustrates an example process flow wherein the hypervisor verifies the integrity of a memory page and method 400 is an example process flow wherein the hypervisor restores an integrity mark to enable the guest operating system to verify the integrity of the memory page. Methods 300 and 400 may be performed by processing devices that may comprise hardware (e.g., circuitry, dedicated logic, programmable logic, microcode, etc.), executable code (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 300 and 400 may be performed by computer system 100 as shown in FIG. 1.

Referring to FIG. 3, method 300 may be performed by processing devices of a server device or a client device and may begin at block 302. At block 302, a processing device executing a hypervisor may determine an integrity mark of a guest operating system. The integrity mark may be associated with content of one or more memory pages. The integrity mark may include a data value assigned to the memory page by the guest operating system and the data value may be page poisoning data that includes a predetermined sequence of bits. In one example, determining the integrity mark may involve the hypervisor receiving data from the guest operating system that indicates the integrity mark of the guest operating system.

At block 304, the processing device executing the hypervisor may detect that a memory page is released by the guest operating system. Detecting that the memory page is released by the guest operating system may involve receiving an indication from the guest operating system. The indication may identify a set of memory pages that were released by the operating system. Receiving the indication may enable the hypervisor to reuse the memory page and avoid copying content of the memory page to persistent storage. In one example, the hypervisor may select the memory page as a candidate for eviction based on detecting that the memory page is released by the guest operating system even though it remains allocated to a virtual machine executing the guest operating system.

At block 306, the processing device executing the hypervisor may verify the content of the memory page in view of the integrity mark of the guest operating system. The verification may determine that the memory page corresponds to (e.g., includes) the integrity mark or that the memory page does not correspond to (e.g., not include) the integrity mark. Verifying the memory page may include one or more verification operations that access content of a memory page and compare it to information indicating the integrity mark (e.g., integrity mark data). The verification operation may involve analyzing the content of the memory page and comparing the content with the integrity mark to determine if there is or is not a match. As discussed above, the integrity mark may occupy a portion of the content of the memory page, all of the content of the memory page, span across multiple memory pages, or a combination thereof. Therefore, the verification operating may compare some or all content of one or more pages to verify the integrity of the memory pages. The integrity mark may be verified at any point before, during, or after the memory page is evicted by the hypervisor. The integrity mark may be verified multiple times and may be verified by the hypervisor, guest operating system, other executable code or device, or a combination thereof. For example, the hypervisor may verify the integrity mark prior to an eviction of the memory page and the guest operating system may also verify the integrity mark after the eviction of the memory page At block 308, the processing device executing the hypervisor may evict the memory page in response to the verifying. Evicting the memory page may involve the hypervisor evicting the memory page without copying the content of the memory page to persistent storage. The persistent storage may be a mass storage device (e.g., Hard Disk Drive (HDD), Solid-State Drive (SSD)) and may include a portion configured as a swap space and the hypervisor may reuse the memory page associated with the guest operating system and avoid copying the content of the memory page to the swap space of any persistent data storage device. In one example, the hypervisor may determine that the memory page fails the verification of the integrity mark and may respond to the failure. The response may include canceling the eviction and providing a notification to the guest operating system. Responsive to completing the operations described herein above with references to block 308, the method may terminate.

Referring to FIG. 4, method 400 may be performed by processing devices of a server device or a client device and may begin at block 402. At block 402, a processing device executing the hypervisor may receive an indication that a guest operating system is attempting to access memory of a virtual machine that was released by the guest operating system. The memory of the virtual machine that was released by the guest operating system may have been subsequently reclaimed by the hypervisor and may include content that is absent from a physical memory device (e.g., main memory). The indication may be based on a page fault and the hypervisor may respond to the indication by selecting a replacement memory page. The replacement memory page may be an existing memory page of the hypervisor or may be a new memory page generated in response to the indication.

At block 404, the processing device executing the hypervisor may determine an integrity mark of the guest operating system. The integrity mark may be associated with one or more memory pages of the guest operating system and each of the one or more memory pages may have the same integrity mark (e.g., identical copy) or a similar integrity mark (e.g., a hypervisor variation of the integrity mark). Determining the integrity mark may involve the hypervisor receiving and storing data from the guest operating system that indicates the integrity mark. In one example, the integrity mark may include a data value assigned to the memory by the virtual machine and the data value may include page poisoning data comprising a predetermined sequence of bits.

At block 406, the processing device executing the hypervisor may update a memory page of the hypervisor to comprise the integrity mark of the guest operating system. The memory page of the hypervisor may function as a replacement memory page that is assigned to the virtual machine to restore memory resources that were previously evicted and reassigned by the hypervisor. As discussed above, the integrity mark data may include value data, instruction data, pattern data, other data, or a combination thereof and the processing device may generate an integrity mark in view of the integrity mark data. The integrity mark generated by the hypervisor may be the same or similar to the original integrity mark generated and assigned to the memory page by the guest operating system. The processing device may then update (e.g., restore, copy, move, write) the replacement memory page to include the generated integrity mark. The hypervisor may update the memory page at any point prior to the guest operating system accessing (e.g., reallocating, reassigning, reusing) the memory page.

At block 408, the processing device executing the hypervisor may provide the guest operating system with access to the memory page comprising the integrity mark (e.g., the replacement memory page). Providing the guest operating system with access to the memory page may involve unlocking the memory page, removing write protection, or mapping the memory page to the address space of the virtual machine. For example, the processing device may map the memory of the virtual machine to the memory page of the hypervisor that comprises the integrity mark. Responsive to completing the operations described herein above with references to block 408, the method may terminate.

Other examples of method 400 may also include more or less blocks and may include features of method 300. For example, method 400 may also involve the hypervisor detecting that the memory of the virtual machine was previously released by the guest operating system and verifying content of the memory in view of the integrity mark of the guest operating system. Verifying the content of the memory may involve accessing, by hypervisor, the content of the memory page while the memory page is assigned to the virtual machine or after the memory is unassigned (e.g., unmapped) from the virtual machine. The processing device may then compare the content of the memory page with the integrity mark of the guest operating system and determine whether the content of the memory page comprises the integrity mark.

The processing device may or may not evict content of the memory in response to the verifying. Evicting the memory page may involve the hypervisor invalidating a guest page table entry corresponding to the memory of the virtual machine. The hypervisor may then enable the content of the memory to be overwritten without copying the content of the memory page to persistent storage. In other examples, the processing device may also restrict access of the guest operating system to the memory prior to verifying the content of the memory. Restricting access may ensure that the memory page is not inadvertently modified during a release operation.

Figure 5:
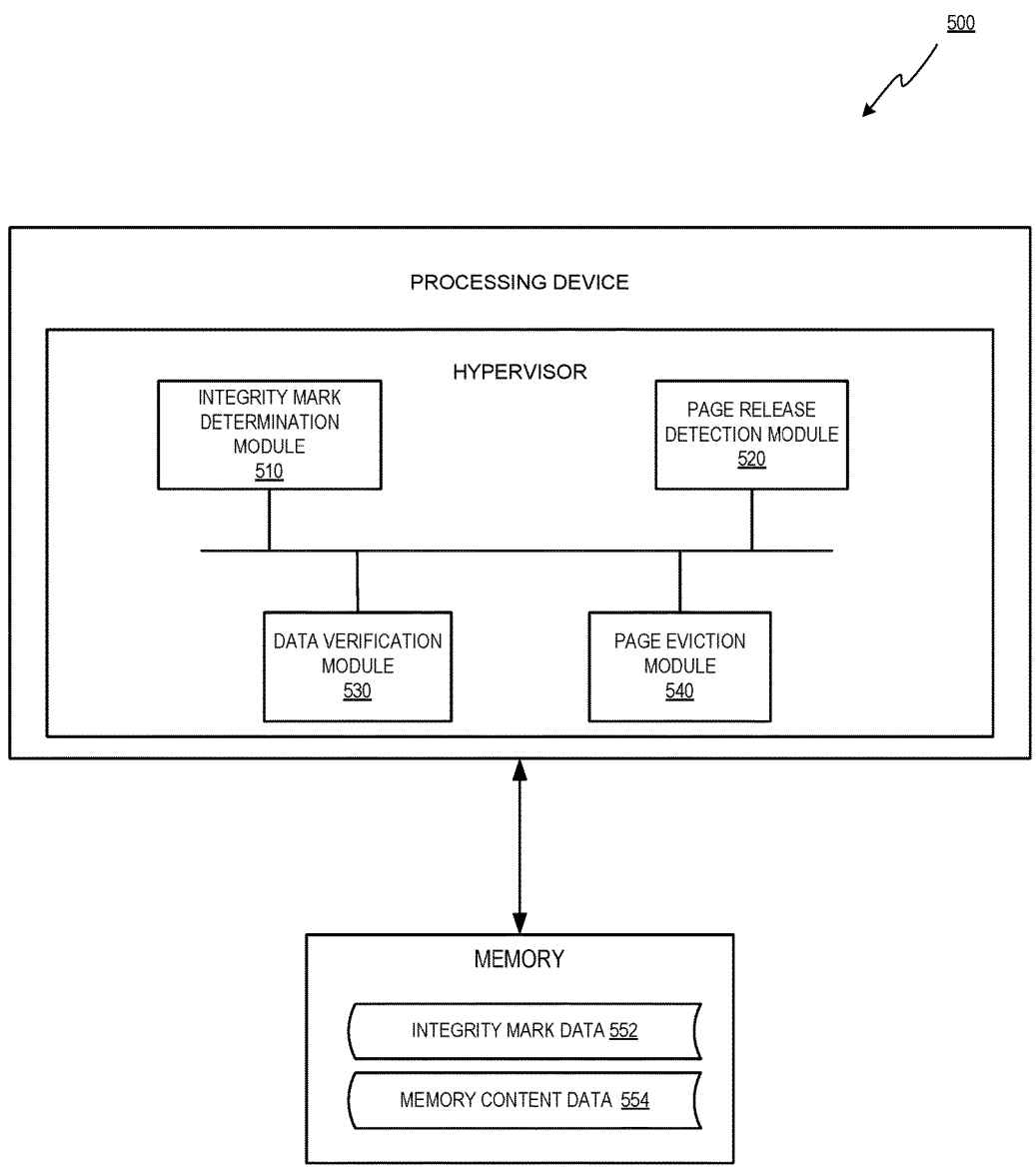
FIG. 5 depicts a block diagram of an example computer system in accordance with one or more aspects of the present disclosure.

FIG. 5 depicts a block diagram of a computer system 500 operating in accordance with one or more aspects of the present disclosure. Computer system 500 may be the same or similar to computer system 100 and may include one or more processing devices and one or more memory devices. In the example shown, computer system 500 may include an integrity mark determination module 510, a page release detection module 520, a data verification module 530, and a page eviction module 540.

Integrity mark determination module 510 may enable a processing device executing a hypervisor to determine an integrity mark of a guest operating system. The integrity mark may be associated with content of one or more memory pages. The integrity mark may include a data value assigned to the memory page by the guest operating system and the data value may be page poisoning data that includes a predetermined sequence of bits. In one example, determining the integrity mark may involve the hypervisor receiving integrity mark data 552 from the guest operating system that indicates the integrity mark of the guest operating system.

Page release detection module 520 may enable the processing device executing the hypervisor to detect that a memory page is released by the guest operating system. Detecting that the memory page is released by the guest operating system may involve receiving an indication from the guest operating system. The indication may identify a set of memory pages that were released by the operating system. Receiving the indication may enable the hypervisor to reuse the memory page and avoid copying content of the memory page to persistent storage. In one example, the hypervisor may select the memory page as a candidate for eviction based on detecting that the memory page is released by the guest operating system even though it remains allocated to a virtual machine executing the guest operating system.

Data verification module 530 may enable the processing device executing the hypervisor to verify the content of the memory page in view of the integrity mark of the guest operating system. The verification may determine that the memory page corresponds to (e.g., includes) the integrity mark or that the memory page does not correspond to (e.g., not include) the integrity mark. Verifying the memory page may include one or more verification operations that access memory content data 554 of a memory page and compare it to information indicating the integrity mark (e.g., integrity mark data 552). The verification operation may involve analyzing the content of the memory page and comparing the content with the integrity mark to determine if there is or is not a match. As discussed above, the integrity mark may occupy a portion of the content of the memory page, all of the content of the memory page, span across multiple memory pages, or a combination thereof. Therefore, the verification operating may compare some or all content of one or more pages to verify the integrity of the memory pages. The integrity mark may be verified at any point before, during, or after the memory page is evicted by the hypervisor. The integrity mark may be verified multiple times and may be verified by the hypervisor, guest operating system, other executable code or device, or a combination thereof. For example, the hypervisor may verify the integrity mark prior to an eviction of the memory page and the guest operating system may also verify the integrity mark after the eviction of the memory page Page eviction module 540 may enable the processing device executing the hypervisor to evict the memory page in response to the verifying. Evicting the memory page may involve the hypervisor evicting the memory page without copying the content of the memory page to persistent storage. The persistent storage may be a mass storage device (e.g., Hard Disk Drive (HDD), Solid-State Drive (SSD)) and may include a portion configured as a swap space and the hypervisor may reuse the memory page associated with the guest operating system and avoid copying the content of the memory page to the swap space of any persistent data storage device. In one example, the hypervisor may determine that the memory page fails the verification of the integrity mark and may respond to the failure.

Figure 6:
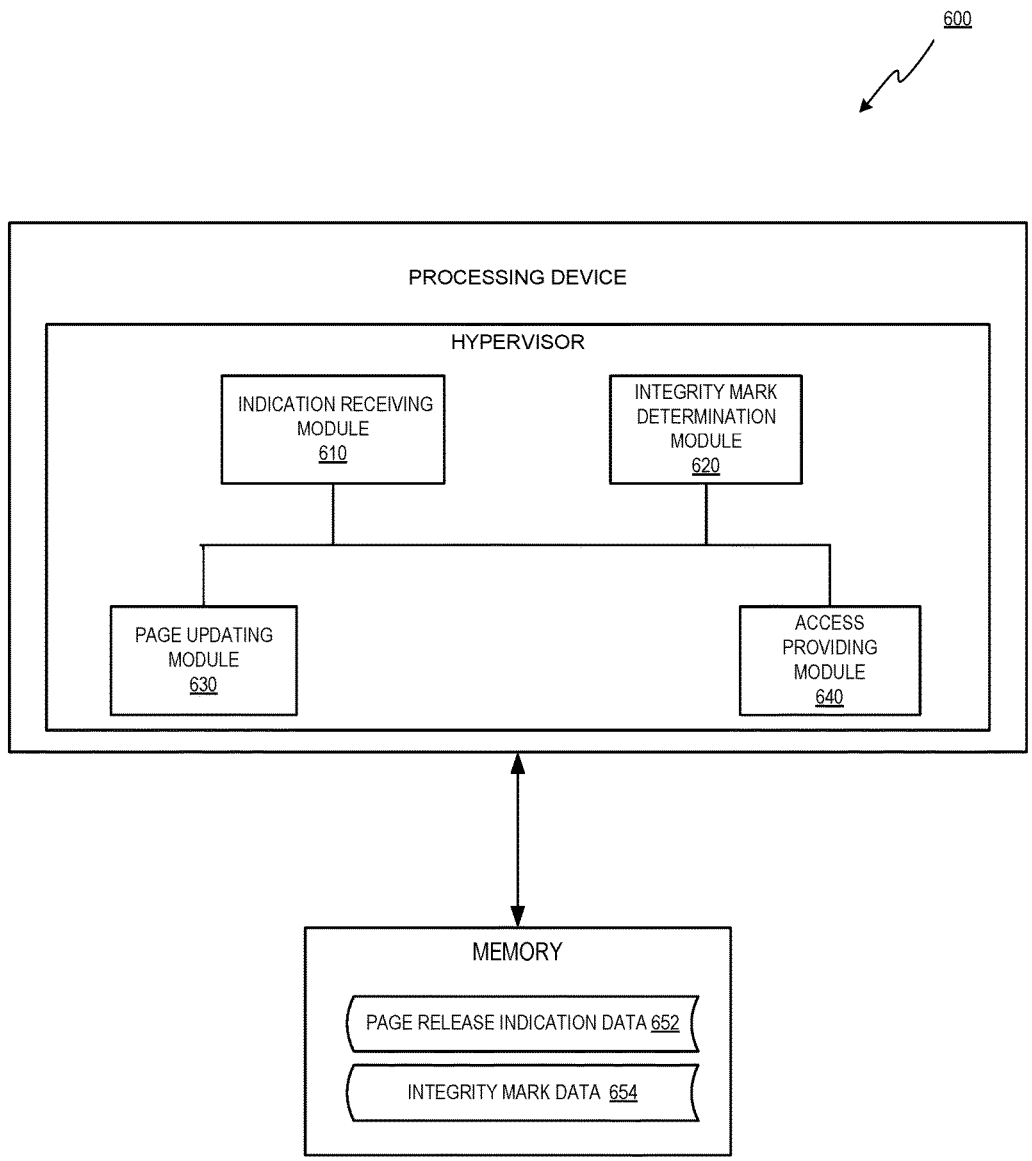
FIG. 6 depicts a block diagram of another example computer system in accordance with one or more aspects of the present disclosure.

FIG. 6 depicts a block diagram of a computer system 600 operating in accordance with one or more aspects of the present disclosure. Computer system 600 may be the same or similar to computer system 100 or 500 and may include one or more processing devices and one or more memory devices. In the example shown, computer system 600 may include an indication receiving module 610, an integrity mark determination module 620, a page updating module 630, and an access providing module 640.

Indication receiving module 610 may enable a processing device executing a hypervisor to receive an indication that a guest operating system is attempting to access memory of a virtual machine that was released by the guest operating system. The memory of the virtual machine that was released by the guest operating system may have been subsequently reclaimed by the hypervisor and may include content that is absent from a physical memory device (e.g., main memory). The indication may be based on a page fault and may include page release indication data 652. The hypervisor may respond to the indication by selecting a replacement memory page and the replacement memory page may be an existing memory page of the hypervisor or may be a new memory page generated in response to the indication.

Integrity mark determination module 620 may enable the processing device executing the hypervisor to determine an integrity mark of the guest operating system. The integrity mark may be associated with one or more memory pages of the guest operating system and each of the one or more memory pages may have the same integrity mark (e.g., identical copy) or a similar integrity mark (e.g., a hypervisor variation of the integrity mark). Determining the integrity mark may involve the hypervisor receiving and storing integrity mark data 654 from the guest operating system that indicates the integrity mark. In one example, the integrity mark may include a data value assigned to the memory by the virtual machine and the data value may include page poisoning data comprising a predetermined sequence of bits.

Page updating module 630 may enable the processing device executing the hypervisor to update a memory page of the hypervisor to comprise the integrity mark of the guest operating system. The memory page of the hypervisor may function as a replacement memory page that is assigned to the virtual machine to restore memory resources that were previously evicted and reassigned by the hypervisor. As discussed above, the integrity mark data may include value data, instruction data, pattern data, other data, or a combination thereof and the processing device may generate an integrity mark in view of the integrity mark data. The integrity mark generated by the hypervisor may be the same or similar to the original integrity mark generated and assigned to the memory page by the guest operating system. The processing device may then update (e.g., restore, copy, move, write) the replacement memory page to include the generated integrity mark. The hypervisor may update the memory page at any point prior to the guest operating system accessing (e.g., reallocating, reassigning, reusing) the memory page.

Access providing module 640 may enable the processing device executing the hypervisor to provide the guest operating system with access to the memory page comprising the integrity mark (e.g., the replacement memory page). Providing the guest operating system with access to the memory page may involve unlocking the memory page, removing write protection, or mapping the memory page to the address space of the virtual machine. For example, the processing device may map the memory of the virtual machine to the memory page of the hypervisor that comprises the integrity mark.

Figure 7:
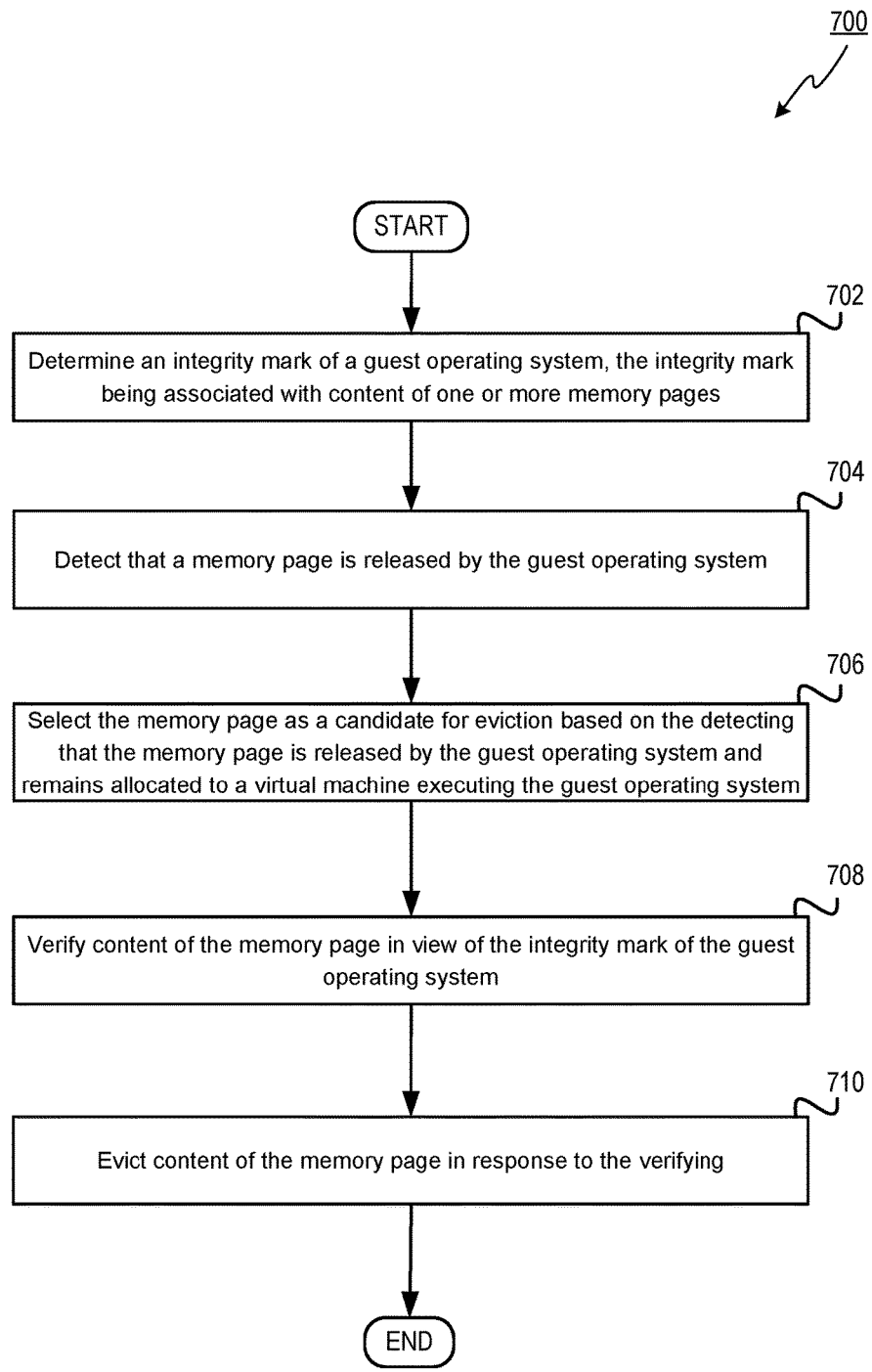
FIG. 7 depicts a flow diagram of another example method executed by a hypervisor to provide an implementation of memory page hinting that supports data integrity verification by the hypervisor, in accordance with one or more aspects of the present disclosure.

Referring to FIG. 7, method 700 may be performed by processing devices of a server device or a client device and may begin at block 702. At block 702, a processing device executing a hypervisor may determine an integrity mark of a guest operating system. The integrity mark may be associated with content of one or more memory pages. The integrity mark may include a data value assigned to the memory page by the guest operating system and the data value may be page poisoning data that includes a predetermined sequence of bits. In one example, determining the integrity mark may involve the hypervisor receiving data from the guest operating system that indicates the integrity mark of the guest operating system.

At block 704, the processing device executing the hypervisor may detect that a memory page is released by the guest operating system. Detecting that the memory page is released by the guest operating system may involve receiving an indication from the guest operating system. The indication may identify a set of memory pages that were released by the operating system. Receiving the indication may enable the hypervisor to reuse the memory page and avoid copying content of the memory page to persistent storage. In one example, the hypervisor may select the memory page as a candidate for eviction based on detecting that the memory page is released by the guest operating system even though it remains allocated to a virtual machine executing the guest operating system.

At block 706, the processing device executing the hypervisor may select the memory page as a candidate for eviction. The selection may be based on detecting that the memory page is released by the guest operating system. The memory page may be released by the guest operating system but may remain allocated to a virtual machine executing the guest operating system.

At block 708, the processing device executing the hypervisor may verify the content of the memory page in view of the integrity mark of the guest operating system. The verification may determine that the memory page corresponds to (e.g., includes) the integrity mark or that the memory page does not correspond to (e.g., not include) the integrity mark. Verifying the memory page may include one or more verification operations that access content of a memory page and compare it to information indicating the integrity mark (e.g., integrity mark data). The verification operation may involve analyzing the content of the memory page and comparing the content with the integrity mark to determine if there is or is not a match. As discussed above, the integrity mark may occupy a portion of the content of the memory page, all of the content of the memory page, span across multiple memory pages, or a combination thereof. Therefore, the verification operating may compare some or all content of one or more pages to verify the integrity of the memory pages. The integrity mark may be verified at any point before, during, or after the memory page is evicted by the hypervisor. The integrity mark may be verified multiple times and may be verified by the hypervisor, guest operating system, other executable code or device, or a combination thereof. For example, the hypervisor may verify the integrity mark prior to an eviction of the memory page and the guest operating system may also verify the integrity mark after the eviction of the memory page At block 710, the processing device executing the hypervisor may evict the memory page in response to the verifying. Evicting the memory page may involve the hypervisor evicting the memory page without copying the content of the memory page to persistent storage. The persistent storage may be a mass storage device (e.g., Hard Disk Drive (HDD), Solid-State Drive (SSD)) and may include a portion configured as a swap space and the hypervisor may reuse the memory page associated with the guest operating system and avoid copying the content of the memory page to the swap space of any persistent data storage device. In one example, the hypervisor may determine that the memory page fails the verification of the integrity mark and may respond to the failure. The response may include canceling the eviction and providing a notification to the guest operating system. Responsive to completing the operations described herein above with references to block 710, the method may terminate.

Figure 8:
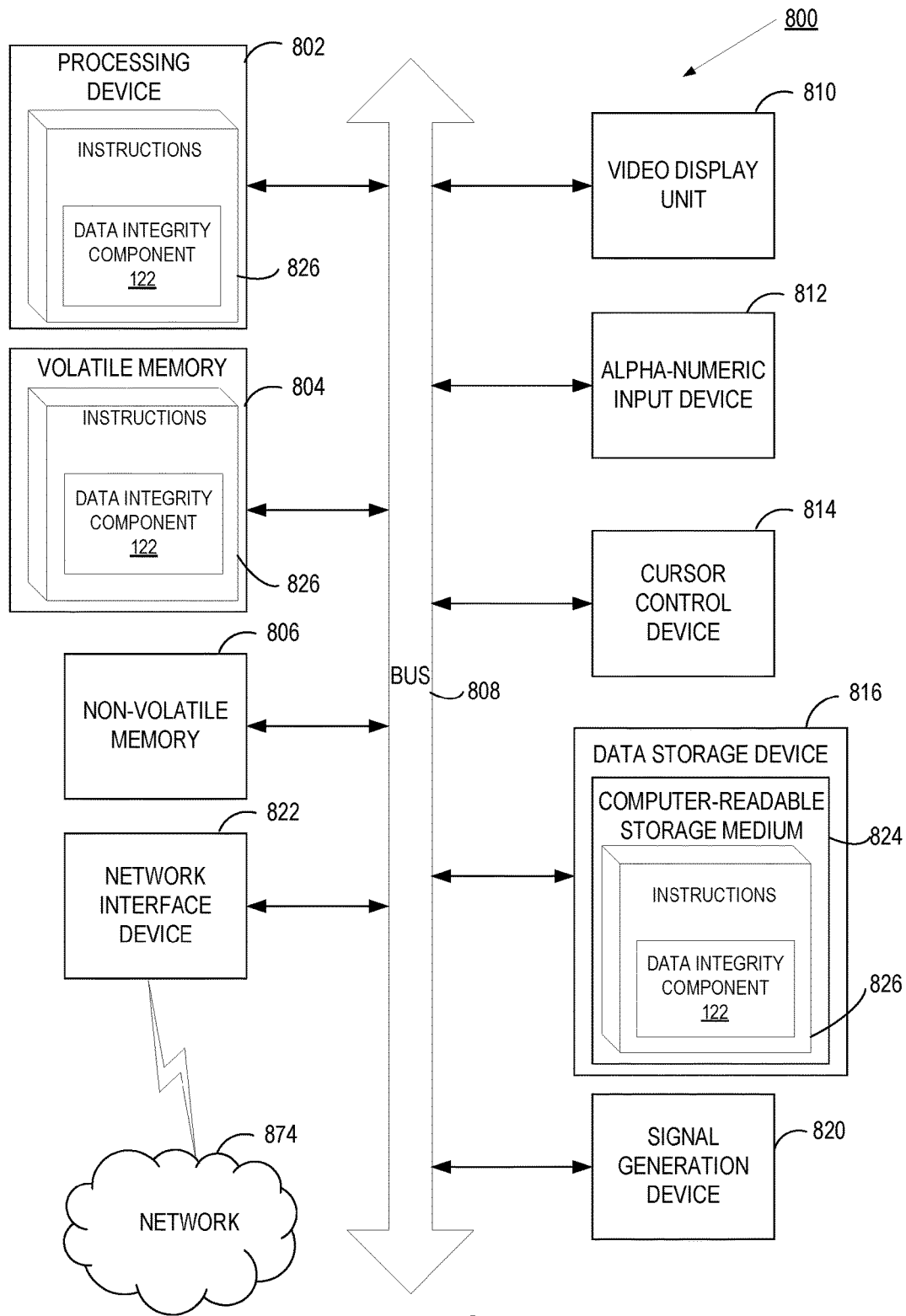
FIG. 8 depicts a block diagram of an illustrative computing device operating in accordance with the examples of the present disclosure.

FIG. 8 depicts a block diagram of a computer system operating in accordance with one or more aspects of the present disclosure. In various illustrative examples, computer system 800 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for implementing methods 300, 400, or 700 and for encoding page hinting component 124 and modules illustrated in FIGS. 1, 2, 5, and 6.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: determining, by a processing device executing a hypervisor, an integrity mark of a guest operating system, the integrity mark being associated with content of one or more memory pages; detecting, by the hypervisor, that a memory page is released by the guest operating system; verifying, by the hypervisor, content of the memory page in view of the integrity mark of the guest operating system; and evicting, by the hypervisor, the content of the memory page in response to the verifying.

Example 2 is a method of example 1 further comprising, selecting, by the hypervisor, the memory page as a candidate for eviction based on the detecting that the memory page is released by the guest operating system and remains allocated to a virtual machine executing the guest operating system.

Example 3 is a method of example 1, wherein the detecting that the memory page is released by the guest operating system comprises detecting an indication of the guest operating system that identifies a set of memory pages released by the guest operating system, wherein the set of memory pages comprises the memory page.

Example 4 is a method of example 1 further comprising, restricting access of the guest operating system to the memory page in response to the detecting the guest operating system released the memory page and prior to verifying the memory page comprises the integrity mark.

Example 5 is a method of example 1, wherein the verifying the content of the memory page in view of the integrity mark of the guest operating system comprises: accessing, by hypervisor, the content of the memory page while the memory page is assigned to a virtual machine executing the guest operating system; comparing the content of the memory page and the integrity mark of the guest operating system; and determining, by the hypervisor, whether the content of the memory page comprises the integrity mark.

Example 6 is a method of example 1, wherein the evicting the memory page comprises: invalidating a guest page table entry corresponding to the memory page; and overwriting, by the hypervisor, the content of the memory page without copying the content of the memory page to persistent storage.

Example 7 is a method of example 1, wherein the determining the integrity mark comprises receiving, by the hypervisor, data from the guest operating system that indicates the integrity mark of the guest operating system.

Example 8 is a method of example 1, wherein the integrity mark comprises data assigned to the memory page by the guest operating system, the data comprising page poisoning data that comprises a predetermined sequence of bits.

Example 9 is a method of example 1, wherein the hypervisor verifies the memory page comprises the integrity mark prior to an eviction of the memory page and the guest operating system verifies the memory page comprises the integrity mark after the eviction of the memory page.

Example 10 is a method of example 1 further comprising, providing a notification to the guest operating system in response to verifying the integrity mark is absent from the one or more memory pages.

Example 11 is a method of example 1, wherein the memory page is updated by the guest operating system to include the integrity mark before the memory page is released by the guest operating system, and wherein the memory page is verified by the guest operating system after the evicting the content of the memory page.

Example 15 is a method comprising: receiving, by a processing device executing a hypervisor, an indication that a guest operating system is attempting to access memory of a virtual machine released by the guest operating system; determining, by the hypervisor, an integrity mark of the guest operating system, wherein the integrity mark is associated with one or more memory pages of the guest operating system; updating, by the hypervisor, a memory page of the hypervisor to comprise the integrity mark of the guest operating system; and providing the guest operating system with access to the memory page comprising the integrity mark.

Example 16 is a method of example 15, wherein the memory of the virtual machine released by the guest operating system is reclaimed by the hypervisor and is absent from a physical memory device.

Example 17 is a method of example 15, wherein the memory page is a memory page of the hypervisor and providing the guest operating system with access to the memory page comprises mapping the memory of the virtual machine to the memory page of the hypervisor comprising the integrity mark.

Example 18 is a method of example 15, wherein determining the integrity mark comprises receiving, by the hypervisor, data from the guest operating system that indicates the integrity mark of the guest operating system.

Example 19 is a method of example 15, wherein the integrity mark comprises a data value assigned to the memory by the virtual machine, wherein the data value comprises page poisoning data comprising a predetermined sequence of bits.

Example 20 is a method of example 15 further comprising, selecting, by the hypervisor, the memory page in response to the indication that the guest operating system is attempting to access the memory of the virtual machine, wherein the selecting comprises selecting a new memory page of the hypervisor.

Example 21 is a method of example 15, further comprising: detecting, by the hypervisor, that the memory of the virtual machine is released by the guest operating system; verifying, by the hypervisor, content of the memory in view of the integrity mark of the guest operating system; and evicting, by the hypervisor, content of the memory in response to the verifying.

Example 22 is a method of example 21 further comprising, restricting, by the hypervisor, access of the guest operating system to the memory prior to the verifying the content of the memory.

Example 23 is a method of example 21, wherein the verifying the content of the memory in view of the integrity mark of the guest operating system comprises: accessing, by hypervisor, the content of the memory page while the memory page is assigned to the virtual machine executing the guest operating system; comparing, by the hypervisor, the content of the memory page and the integrity mark of the guest operating system; and determining, by the hypervisor, whether the content of the memory page comprises the integrity mark.

Example 24 is a method of example 21, wherein the evicting the memory page comprises: invalidating a guest page table entry corresponding to the memory; and overwriting, by the hypervisor, the content of the memory without copying the content of the memory page to persistent storage.

Example 25 is a system comprising: a memory; a processing device executing a hypervisor and operatively coupled to the memory, the processing device to: determine an integrity mark of a guest operating system, the integrity mark being associated with content of one or more memory pages; detect that a memory page is released by the guest operating system; verify content of the memory page in view of the integrity mark of the guest operating system; and evict the content of the memory page in response to the verifying.

Example 26 is a system of example 25, wherein the processing device executing the hypervisor is to select the memory page as a candidate for eviction based on the detecting that the memory page is released by the guest operating system and remains allocated to a virtual machine executing the guest operating system.

Example 27 is a system of example 25, wherein to detect that the memory page is released by the guest operating system the processing device is to detect an indication of the guest operating system that identifies a set of memory pages released by the guest operating system, wherein the set of memory pages comprises the memory page.

Example 28 is a system of example 25, wherein the processing device executing the hypervisor is to restrict access of the guest operating system to the memory page in response to the detecting the guest operating system released the memory page and prior to verifying the memory page comprises the integrity mark.

Example 29 is a system of example 25, wherein to verify the content of the memory page the processing device is to: access the content of the memory page while the memory page is assigned to a virtual machine executing the guest operating system; compare the content of the memory page and the integrity mark of the guest operating system; and determine whether the content of the memory page comprises the integrity mark.

Example 30 is a system of example 25, wherein to evict the memory page the processing device is to: invalidate a guest page table entry corresponding to the memory page; and overwrite the content of the memory page without copying the content of the memory page to persistent storage.

Example 31 is a system of example 25, wherein to determine the integrity mark the processing device is to receive data from the guest operating system that indicates the integrity mark of the guest operating system.

Example 32 is a system of example 25, wherein the integrity mark comprises data assigned to the memory page by the guest operating system, the data comprising page poisoning data that comprises a predetermined sequence of bits.

Example 33 is a system comprising: a memory; a processing device executing a hypervisor and operatively coupled to the memory, the processing device to: receive an indication that a guest operating system is attempting to access memory of a virtual machine released by the guest operating system; determine an integrity mark of the guest operating system, wherein the integrity mark is associated with one or more memory pages of the guest operating system; update a memory page of the hypervisor to comprise the integrity mark of the guest operating system; and provide the guest operating system with access to the memory page comprising the integrity mark.

Example 34 is a system of example 33, wherein the memory of the virtual machine released by the guest operating system is reclaimed by the hypervisor and is absent from a physical memory device.

Example 35 is a system of example 33, wherein the memory page is a memory page of the hypervisor and providing the guest operating system with access to the memory page comprises mapping the memory of the virtual machine to the memory page of the hypervisor comprising the integrity mark.

Example 36 is a system of example 33, wherein determining the integrity mark comprises receiving, by the hypervisor, data from the guest operating system that indicates the integrity mark of the guest operating system.

Example 37 is a non-transitory machine-readable storage medium storing instructions executing a hypervisor that cause a processing device to: determine an integrity mark of a guest operating system, the integrity mark being associated with content of one or more memory pages; detect that a memory page is released by the guest operating system; select the memory page as a candidate for eviction based on the detecting that the memory page is released by the guest operating system and remains allocated to a virtual machine executing the guest operating system; verify content of the memory page in view of the integrity mark of the guest operating system; and evict the content of the memory page in response to the verifying.

Example 38 is a non-transitory machine-readable storage medium of example 37, wherein to determine the integrity mark the processing device is to receive data from the guest operating system that indicates the integrity mark of the guest operating system.

Example 39 is a non-transitory machine-readable storage medium of example 37, wherein the integrity mark comprises data assigned to the memory page by the guest operating system, the data comprising page poisoning data that comprises a predetermined sequence of bits.

Example 40 is a non-transitory machine-readable storage medium of example 37, wherein the hypervisor is to verify the memory page comprises the integrity mark prior to an eviction of the memory page and the guest operating system verifies the memory page comprises the integrity mark after the eviction of the memory page.

Example 41 is an apparatus comprising: a means for determining, by a processing device executing a hypervisor, an integrity mark of a guest operating system, the integrity mark being associated with content of one or more memory pages; a means for detecting, by the hypervisor, that a memory page is released by the guest operating system; a means for verifying, by the hypervisor, content of the memory page in view of the integrity mark of the guest operating system; and a means for evicting, by the hypervisor, the content of the memory page in response to the verifying.

Example 42 is an apparatus comprising: a means for receiving, by a processing device executing a hypervisor, an indication that a guest operating system is attempting to access memory of a virtual machine released by the guest operating system; a means for determining, by the hypervisor, an integrity mark of the guest operating system, wherein the integrity mark is associated with one or more memory pages of the guest operating system; a means for updating, by the hypervisor, a memory page of the hypervisor to comprise the integrity mark of the guest operating system; and a means for providing the guest operating system with access to the memory page comprising the integrity mark.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "verifying," "evicting," "selecting," "restricting," "receiving," "updating," "providing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    determining, by a processing device executing a hypervisor, an integrity mark of a guest operating system, the integrity mark being associated with content of one or more memory pages;
    detecting, by the hypervisor, that a memory page is released by the guest operating system;
    verifying, by the hypervisor, content of the memory page in view of the integrity mark of the guest operating system; and
    evicting, by the hypervisor, the content of the memory page in response to the verifying.

2. The method of claim 1 further comprising, selecting, by the hypervisor, the memory page as a candidate for eviction based on the detecting that the memory page is released by the guest operating system and remains allocated to a virtual machine executing the guest operating system.

3. The method of claim 1, wherein the detecting that the memory page is released by the guest operating system comprises detecting an indication of the guest operating system that identifies a set of memory pages released by the guest operating system, wherein the set of memory pages comprises the memory page.

4. The method of claim 1 further comprising, restricting access of the guest operating system to the memory page in response to the detecting the guest operating system released the memory page and prior to verifying the memory page comprises the integrity mark.

5. The method of claim 1, wherein the verifying the content of the memory page in view of the integrity mark of the guest operating system comprises:
    accessing, by the hypervisor, the content of the memory page while the memory page is assigned to a virtual machine executing the guest operating system;
    comparing the content of the memory page and the integrity mark of the guest operating system; and
    determining, by the hypervisor, whether the content of the memory page comprises the integrity mark.

6. The method of claim 1, wherein the evicting the memory page comprises:
    invalidating a guest page table entry corresponding to the memory page; and
    overwriting, by the hypervisor, the content of the memory page without copying the content of the memory page to a persistent storage.

7. The method of claim 1, wherein the determining the integrity mark comprises receiving, by the hypervisor, data from the guest operating system that indicates the integrity mark of the guest operating system.

8. The method of claim 1, wherein the integrity mark comprises data assigned to the memory page by the guest operating system, the data comprising page poisoning data that comprises a predetermined sequence of bits.

9. The method of claim 1, wherein the hypervisor verifies that the memory page comprises the integrity mark prior to an eviction of the memory page and the guest operating system verifies that the memory page comprises the integrity mark after the eviction of the memory page.

10. The method of claim 1 further comprising, providing a notification to the guest operating system in response to verifying the integrity mark is absent from the one or more memory pages.

11. The method of claim 1, wherein the memory page is updated by the guest operating system to include the integrity mark before the memory page is released by the guest operating system, and wherein the memory page is verified by the guest operating system after the evicting the content of the memory page.

12. A system comprising:
a memory;
a processing device executing a hypervisor and operatively coupled to the memory, the processing device to:
   receive an indication that a guest operating system is attempting to access memory of a virtual machine released by the guest operating system;
   determine an integrity mark of the guest operating system, wherein the integrity mark is associated with one or more memory pages of the guest operating system;
   update a memory page of the hypervisor to comprise the integrity mark of the guest operating system; and
   provide the guest operating system with access to the memory page comprising the integrity mark.

13. The system of claim 12, wherein the memory of the virtual machine released by the guest operating system is reclaimed by the hypervisor and is absent from a physical memory device.

14. The system of claim 12, wherein the memory page is a memory page of the hypervisor and providing the guest operating system with access to the memory page comprises mapping the memory of the virtual machine to the memory page of the hypervisor comprising the integrity mark.

15. The system of claim 12, wherein determining the integrity mark comprises receiving, by the hypervisor, data from the guest operating system that indicates the integrity mark of the guest operating system.

16. A non-transitory machine-readable storage medium storing instructions executing a hypervisor that cause a processing device to:
   determine an integrity mark of a guest operating system, the integrity mark being associated with content of one or more memory pages;
   detect that a memory page is released by the guest operating system;
   select the memory page as a candidate for eviction based on the detecting that the memory page is released by the guest operating system and remains allocated to a virtual machine executing the guest operating system;
   verify content of the memory page in view of the integrity mark of the guest operating system; and
   evict the content of the memory page in response to the verifying.

17. The non-transitory machine-readable storage medium of claim 16, wherein to determine the integrity mark the processing device is to receive data from the guest operating system that indicates the integrity mark of the guest operating system.

18. The non-transitory machine-readable storage medium of claim 16, wherein the integrity mark comprises data assigned to the memory page by the guest operating system, the data comprising page poisoning data that comprises a predetermined sequence of bits.

19. The non-transitory machine-readable storage medium of claim 16, wherein the hypervisor is to verify the memory page comprises the integrity mark prior to an eviction of the memory page and the guest operating system verifies the memory page comprises the integrity mark after the eviction of the memory page.

20. The non-transitory machine-readable storage medium of claim 16, wherein the hypervisor verifies that the memory page comprises the integrity mark prior to an eviction of the memory page and the guest operating system verifies that the memory page comprises the integrity mark after the eviction of the memory page.

* * * * *